US011883705B1

(12) United States Patent
Banner

(10) Patent No.: US 11,883,705 B1
(45) Date of Patent: Jan. 30, 2024

(54) NOSA MD COMPOSITION AND METHOD OF MANUFACTURE

(71) Applicant: Swamp Fox Innovations, LLC, Ames, IA (US)

(72) Inventor: Larry Todd Banner, Ames, IA (US)

(73) Assignee: Swamp Fox Innovations, LLC, Ames, IA (US)

( * ) Notice: Subject to any disclaimer, the term of this patent is extended or adjusted under 35 U.S.C. 154(b) by 0 days.

(21) Appl. No.: 17/825,894

(22) Filed: May 26, 2022

Related U.S. Application Data

(60) Provisional application No. 63/193,393, filed on May 26, 2021.

(51) Int. Cl.
*A62D 1/02* (2006.01)
*C11D 1/08* (2006.01)

(52) U.S. Cl.
CPC .............. *A62D 1/0071* (2013.01); *C11D 1/08* (2013.01)

(58) Field of Classification Search
None
See application file for complete search history.

(56) References Cited

U.S. PATENT DOCUMENTS

| | | | | |
|---|---|---|---|---|
| 5,795,397 A * | 8/1998 | Shi | C09J 103/02 127/29 |
| 2004/0033745 A1* | 2/2004 | Eden | D04H 1/413 424/443 |
| 2020/0207878 A1* | 7/2020 | Shi | C08B 31/04 |

FOREIGN PATENT DOCUMENTS

CN 104231092 * 12/2014

OTHER PUBLICATIONS

CN 107557409 A (English language abstract and claims). (Year: 2018).*
CN 111803685 A (English language abstract) (Year: 2020).*
Bai, Yanjie , "Preparation and Structure of Octenyl Succinic Anhydride Modified Waxy Maize Starch, Microporous Starch and Maltodextrin", Thesis, Dept. of Grain Science and Industry, College of Agriculture, Kansas State University, 2008.

* cited by examiner

*Primary Examiner* — Joseph D Anthony
(74) *Attorney, Agent, or Firm* — Dentons Davis Brown; Matthew Coryell

(57) ABSTRACT

Disclosed herein is a method of making a foaming agent by preparing a liquid maltodextrin solution by dissolving maltodextrin in a solvent; combining the liquid maltodextrin solution with an octenyl succinic anhydride (OSA) solution to form a biphasic maltodextrin-OSA mixture; agitating the biphasic maltodextrin-OSA mixture until homogenous creating a homogenous solution; adjusting the pH of the homogenous solution to a predetermined threshold to yield the foaming agent; and adding glycerol to the foaming agent to form a shelf stable foaming agent.

17 Claims, 1 Drawing Sheet

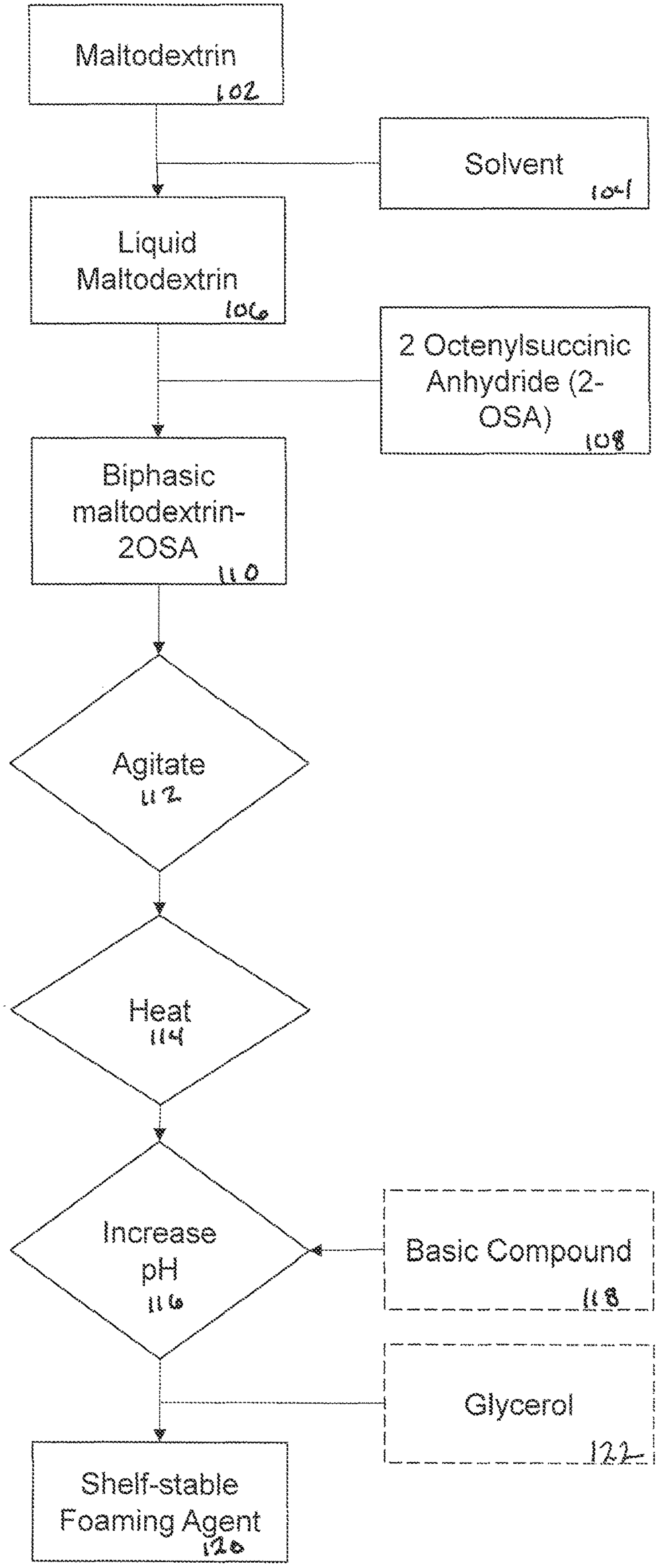
Maltodextrin
102
Solvent
104
Liquid Maltodextrin
106
2 Octenylsuccinic Anhydride (2-OSA)
108
Biphasic maltodextrin-2OSA
110
Agitate
112
Heat
114
Increase pH
116
Basic Compound
118
Glycerol
122
Shelf-stable Foaming Agent
120

NOSA MD COMPOSITION AND METHOD OF MANUFACTURE

CROSS-REFERENCE TO RELATED APPLICATION(S)

This application claims priority to U.S. Provisional Application No. 63/193,393 filed May 26, 2021, and entitled "NOSA MD COMPOSITION AND METHOD OF MANUFACTURE," which is hereby incorporated by reference in its entirety under 35 U.S.C. § 119(e).

TECHNICAL FIELD

The disclosure relates to methods for manufacturing modified maltodextrin. This disclosure further relates to compositions with surfactant and foaming properties.

BACKGROUND

Foaming agents are a critical tool in various industries. Perfluorooctanesulfonic acid (PFOS) and Perfluorooctanoic acid (PFOA) are widely used as foams. However, use of these surfactants comes at significant environmental and health risk. The EPA has stated that PFOA and PFOS are extremely persistent in the environment and resistant to typical environmental degradation processes. They are widely distributed across the higher trophic levels and are found in soil, air, and groundwater at sites across the United States. The toxicity, mobility and bioaccumulation potential of PFOS and PFOA pose potential adverse effects for the environment and human health. Accordingly, there is a need in the art for cost effective and shelf-stable liquid surfactants and foaming agents without the environmental and health effects of PFOA and PFOS.

BRIEF SUMMARY

Disclosed herein is a method of making a foaming agent by preparing a liquid maltodextrin solution by dissolving maltodextrin in a solvent; combining the liquid maltodextrin solution with an octenyl succinic anhydride (OSA) solution to form a biphasic maltodextrin-OSA mixture; agitating the biphasic maltodextrin-OSA mixture until homogenous creating a homogenous solution; adjusting the pH of the homogenous solution to a predetermined threshold to yield the foaming agent; and adding glycerol to the foaming agent to form a shelf stable foaming agent.

In certain embodiments, the maltodextrin and OSA are present at a ratio of about 1:10 wt./wt.

In further embodiments, the glycerol is added in an amount about equal to the amount of maltodextrin, by weight. In further embodiments, the solvent is water and wherein the maltodextrin and water are present at about equal parts, by weight.

In certain embodiments, the method further includes the step of heating the biphasic maltodextrin-OSA mixture during agitation. In exemplary implementations, the biphasic maltodextrin-OSA mixture is heated to about 60° C. during agitation.

In certain embodiments, the disclosed method further includes the step of monitoring the pH of the biphasic maltodextrin-OSA mixture. In certain implementations, the agitation step is performed until the pH decreases to about 2.5.

According to certain embodiments, the OSA solution and the maltodextrin are present at a ratio of about 1:10 wt/wt.

In certain embodiments, the OSA is a cis and trans mixture.

According to certain embodiments, the pH of the homogenous solution is adjusted through the addition of sodium hydroxide. In exemplary implementations, the sodium hydroxide is a 50% solution of sodium hydroxide.

In certain embodiments, the predetermined threshold pH is about 3.6.

In certain aspects, the shelf stable foaming agent prepared according to the instantly disclosed methods has a water activity of about 0.77. In further aspects, the shelf stable foaming agent is shelf stable for least about a year. In yet further aspects, the shelf stable foaming agent does not biodegrade. In still further aspects, the modified maltodextrin is a surfactant. In yet further aspects, the modified maltodextrin has foaming properties.

Further disclosed herein is a foaming agent made according to any of the foregoing methods. In exemplary implementations, the foaming agent is effective as a firefighting foam.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 1 is a diagram of the method, according to one implementation.

DETAILED DESCRIPTION

As used herein, the singular forms "a," "an," and "the" include plural referents unless the context clearly dictates otherwise. Thus, for example, reference to "an active component" refers to one or mixtures of active components, and reference to "the method for" includes reference to equivalent steps and methods known to those skilled in the art, and so forth.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of particles would either completely lack particles, or so nearly completely lack particles that the effect would be the same as if it completely lacked particles. In other words, a composition that is "substantially free of an ingredient or element may still actually contain such item as long as there is no measurable effect thereof.

Disclosed herein is a method of making a surfactant and/or foaming agent through modification of maltodextrin. In various implementations, the method includes a series of steps, as would be understood the steps may be performed in a variety of orders or may not be performed at all. In certain embodiments, various step may occur simultaneously and/or in sequence. Disclosed herein are various methods for manufacturing a modified maltodextrin (NOSA-MD) that has properties as a surfactant and foaming agent. The product is further formulated with glycerol so that it forms a shelf-stable liquid formulation. This material has potential advantages over other foaming materials (such as fluorinated surfactants) in that it is bio-based and eco-friendly. It may potentially cost much less than other surfactants and foaming agents.

FIG. 1 is an exemplary process diagram showing various steps of the method. In certain aspects, the method comprises the steps of preparing a liquid maltodextrin solution 106 by dissolving maltodextrin 102 in a solvent 104, combining the liquid maltodextrin solution 106 with a 2-Octenylsuccinic Anhydride (2-OSA) 108 solution to form a biphasic maltodextrin-2OSA mixture 110; agitating 112 the biphasic maltodextrin-2OSA mixture until homogenous, creating a homogenous solution; heating 114 the biphasic maltodextrin-2OSA mixture 110; and increasing 116 the pH of the homogenous solution to a predetermined threshold to yield the foaming agent 120.

In certain embodiments, the disclosed method also comprises an additional step of adding glycerol 122 to the foaming agent 120 to form a shelf stable foaming agent 120. In exemplary implementations of these embodiments, the amount of glycerol 122 added is about equal to the amount of maltodextrin 102, by weight. By way of non-limiting example, if 5 kg of maltodextrin 102 were added in preparing the liquid maltodextrin 106, then 5 kg of glycerol 122 would be added in preparing the shelf stable foaming agent 120.

According to certain embodiments and continuing with FIG. 1 in more detail, maltodextrin 102 is combined with a solvent 104 to create a liquid maltodextrin solution 106. In various embodiments, the solvent 104 used in preparing the liquid maltodextrin solution 106 is water. In exemplary implementations of these embodiments, the maltodextrin 102 and water 104 are present at about equal parts, by weight. The amount of water may range from about 10% to about 50% by weight, and the amount of maltodextrin may range from about 10% to about 50% by weight.

In a further step, the liquid maltodextrin solution is combined with a 2-OSA solution 108 (also referred to as n-octenyl succinic anhydride or octenyl succinic anhydride) to create a biphasic maltodextrin-2OSA mixture 110. In various embodiments, the 2-OSA solution 108 and the maltodextrin 102 are present at a ratio of about 1:10 wt./wt. Alternatively, the 2-OSA:MD ratio may range from about 1:50 to about 1:5 wt./wt. In certain implementations, the 2-OSA is a cis- and trans-mixture.

In various embodiments, the 2-OSA solution 108 forms an oil layer within the liquid maltodextrin mixture 106. According to certain embodiments, the pH of the biphasic maltodextrin-2OSA mixture 110 upon initial formation is about 5. As would be understood, the pH of the biphasic maltodextrin-2OSA solution is inherent to the pH of its constituent ingredients and may vary to the same degree as the constituent ingredients.

In certain aspects, the biphasic maltodextrin-2OSA mixture 110 is agitated 112 until mixture forms an emulsion whereby the 2-OSA 108 oil layer is combined into the liquid maltodextrin 106 and a homogenous mixture is formed. In certain implementations, the agitation 112 is performed through use of an overhead agitator. Various alternative mechanisms for stirring and/or agitating are of course possible and would be recognized by those of skill in the art. In exemplary implementations, the overhead agitator is operated at from about 100 rpm to about 500 rpm, and optionally about 450 rpm. In certain implementations, the agitation 112 step is conducted at a range of speeds, for example beginning at a high shear and reducing to a lower shear when the maltodextrin is dissolved. In creating a homogenous mixture, the 2-OSA 108 reacts with the maltodextrin 102.

According to further embodiments, the step of agitating 112 the biphasic maltodextrin-2OSA mixture 110 further comprises heating 114 the biphasic maltodextrin-2OSA mixture. In certain implementations, agitation 112 and heating 114 occur simultaneously or in sequence. In exemplary implementations, the mixture is heated 114 to between about 35° C. and about 70° C. and optionally to between about 50° C. and about 60° C. In a further exemplary implementation, the mixture is heated 114 to about 60° C.

According to still further embodiments, the step(s) of agitating 112 and/or heating 114 the biphasic maltodextrin-2OSA mixture 110 also includes monitoring the pH of the mixture. In certain implementations, pH is monitored by taking samples of the mixture and testing the samples though various methods known in the art. In further implementations, the pH is monitored through use of a pH probe placed in the reaction vessel. Monitoring of pH may be periodic or continuous, as would be understood.

In certain embodiments, the pH of the maltodextrin-2OSA mixture decreases through the course of the of the agitation 112/heating 114 step(s) as the maltodextrin 102 reacts with the 2OSA 108. According to certain embodiments, the agitation 112/heating 114 step(s) is performed until the mixture reaches a predetermined threshold pH. In exemplary implementations, the predetermined threshold pH is between about 2.4 and 2.6 and optionally is about 2.5.

In a further optional step, the pH of the maltodextrin-2OSA mixture 110 may be adjusted/increased 116. According to some embodiments, the pH is increased 116 via the addition of a basic compound 118, such as one or more of sodium hydroxide, potassium hydroxide, trisodium citrate, tripotassium citrate, ammonium hydroxide, and the like. In various embodiments, the pH may be increased 116 to between about 3.0 and about 4.0. In certain implementations, the pH is increased 116 to about 3.6. In various implementations, the pH of the mixture 110 should be adjusted 116 to be lower than the pH at which microbes may grow at the particular water activity of the mixture. In certain implementation, the pH should be adjusted 116 to be higher than 3.0, the level at which the mixture 110 would be considered corrosive by the EPA.

In various implementations, after the pH adjustment 116 the modified maltodextrin foaming agent 120 is formed. In various implementation, the foaming agent 120 may be diluted in a diluent, such as water. Various alternative diluents are possible, for example non-flammable water soluble polyols, such as polyethylene glycols, polyglycerols, polyvinyl alcohols, and the like. In certain implementations, the foaming agent 120 is diluted to between about 5% and about 75%. In one particular implementation, the foaming agent 120 is diluted to about 30%.

In certain embodiments, glycerol 122 may be added to the foaming agent 120. In various embodiments, the addition of glycerol 122 may provide shelf-stability to the foaming agent 120. Glycerol 122 acts to lower the water activity of the foaming agent 120 in order to provide shelf stability, while to yielding a flowable liquid. In certain embodiments, the foaming agent 120 may be shelf stable for at least about one-year or more. In certain implementations, glycerol 122 is added to the foaming agent in about equal parts to the amount of maltodextrin 102 starting material, by weight, although other ratios are possible. In various implementations, the ratio of NOSA-MD 120 to glycerol 122 may range from about 2:1 to about 1:2.

According to certain implementations, the shelf stable foaming agent 120 may include about 33% NOSA-MD, about 33% glycerin, and about 33% water. Alternative percentages are of course possible and range from about 10%-50% water, about 10%-50% NOSA MD, and about 10%-50% glycerin.

In various implementations, the pH of the shelf stable foaming agent 120 is about 3.6 and has a water activity of about 0.77. In certain implementations, the pH of the foaming agent 120 is within a range of about 2.5 to about 4.5. In various implementations, the foaming agent 120 has a water activity of between about 0.70 and 0.90 and in any case less than about 0.9. In certain implementations, the foaming agent 120 is not biodegradable. In various implementations, the foaming agent 120 has surfactant and/or foaming properties.

In various implementations, the foaming agent 120 may be applied via a hand pump or other appropriate implement as would be appreciated by those of skill in the art. In certain implementations, the foaming agent 120 may be used in the fighting of fires as an environmentally friendly fire suppressant.

Various aspects and embodiments of the present invention are defined by the following numbered clauses:

1. A method of making a foaming agent comprising:
   providing a liquid maltodextrin solution comprising maltodextrin and a solvent; combining the liquid maltodextrin solution with an octenyl succinic anhydride (OSA) solution to form a biphasic maltodextrin-OSA mixture;
   agitating the biphasic maltodextrin-OSA mixture until homogenous creating a homogenous solution;
   adjusting the pH of the homogenous solution to a predetermined threshold to yield the foaming agent; and
   adding glycerol to the foaming agent to form a shelf stable foaming agent.
2. The method of clause 1, wherein the maltodextrin and OSA are present at a ratio of about 1:10 wt./wt.
3. The method of any preceding clause, wherein the glycerol added in an amount about equal to the amount of maltodextrin, by weight.
4. The method of any preceding clause, wherein the solvent is water and wherein the maltodextrin and water are present at about equal parts, by weight.
5. The method of any preceding clause, further comprising heating the biphasic maltodextrin-OSA mixture during agitation.
6. The method of any preceding clause, wherein the biphasic maltodextrin-OSA mixture is heated to about 60° C. during agitation.
7. The method of any preceding clause, further comprising monitoring the pH of the biphasic maltodextrin-OSA mixture.
8. The method of clause 7, wherein the agitation step is performed until the pH decreases to about 2.5.
9. The method of any preceding clause, wherein the OSA solution and the maltodextrin are present at a ratio of about 1:10 wt/wt.
10. The method of any preceding clause, wherein the OSA is a cis and trans mixture.
11. The method of any preceding clause, wherein the pH of the homogenous solution is adjusted through the addition of sodium hydroxide.
12. The method of claim 11, wherein the sodium hydroxide is a 50% solution of sodium hydroxide.
13. The method of any preceding clause, the predetermined threshold pH is about 3.6
14. The method of any preceding clause, wherein the shelf stable foaming agent has a water activity of about 0.77.
15. The method of any preceding clause, wherein the shelf stable foaming agent is shelf stable for least about a year.
16. The method of any preceding clause, wherein the shelf stable foaming agent does not biodegrade.
17. The method of any preceding clause, wherein the modified maltodextrin is a surfactant.
18. The method of any preceding clause, wherein the modified maltodextrin has foaming properties.
19. A foaming agent made according to the method of any preceding clause.
20. The foaming agent of clause 19, wherein the foaming agent is effective as a firefighting foam.
21. A method of making a foaming agent comprising:
   providing a liquid maltodextrin solution comprising maltodextrin and a solvent;
   combining the liquid maltodextrin solution with an octenyl succinic anhydride (OSA) solution to form a biphasic maltodextrin-OSA mixture, wherein the OSA solution and the maltodextrin are present at a ratio of about 1:10 wt/wt;
   agitating the biphasic maltodextrin-OSA mixture until homogenous and until the pH decreases to about 2.5 creating a homogenous solution and;
   adjusting the pH of the homogenous solution to a predetermined threshold to yield the foaming agent; and
   adding glycerol to the foaming agent to form a shelf stable foaming agent.
22. A foaming agent prepared by providing a liquid maltodextrin solution comprising maltodextrin and a solvent;
   combining the liquid maltodextrin solution with an octenyl succinic anhydride (OSA) solution to form a biphasic maltodextrin-OSA mixture, wherein the OSA solution and the maltodextrin are present at a ratio of about 1:10 wt/wt;
   agitating the biphasic maltodextrin-OSA mixture until homogenous and until the pH decreases to about 2.5 creating a homogenous solution and;
   adjusting the pH of the homogenous solution to a predetermined threshold to yield the foaming agent; and adding glycerol to the foaming agent to form a shelf stable foaming agent.

EXAMPLE

The following examples are put forth so as to provide those of ordinary skill in the art with a complete disclosure and description of certain examples of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

This example generally follows the process diagram outlined in FIG. 1, in the first step 5 kg of maltodextrin (~10 DE, M100 Maltrin, GPC) and 5 kg water were combined in a reaction vessel. The maltodextrin and water were mixed at 30° C. until the maltodextrin solids were completely dispersed, creating a liquid maltodextrin mixture.

In the next step, the liquid maltodextrin mixture was heated to 60° C. and stirred with an overhead agitator at 450 rpm. The pH of this liquid maltodextrin mixture was 5.0.

500 g of 2-OSA (2-Octenylsuccinic Anhydride (cis- and trans-mixture) 95.0+%, TCI America™) was added to the liquid maltodextrin mixture. Upon combination, an oil layer, containing the 2-OSA, was formed within the liquid maltodextrin mixture creating a biphasic maltodextrin-2OSA mixture. The pH of the biphasic maltodextrin-2OSA mixture was 4.2.

The biphasic maltodextrin-2OSA mixture was agitated and heated. During agitation and heating, the pH of the maltodextrin-2OSA mixture decreased until the pH reached 2.5. During agitation and heating, the oil layer of 2-OSA found in the biphasic maltodextin-2OSA mixture became combined with the liquid maltodextrin to create a homogenous mixture. The creation of a homogenous mixture indicated that the 2-OSA had reacted with the maltodextrin within the liquid maltodextrin mixture.

The pH of the homogenous mixture was increased, to yield the foaming agent. The pH was increased by the addition of a 50% sodium hydroxide solution to the homogenous mixture. The pH was increased until the pH of the homogenous mixture was 3.6, which required about 20 mL of 50% sodium hydroxide.

In a further step, a sample of the foaming agent was diluted to about 30% with water. The diluted foaming agent was then applied through a foam-producing hand pump, and yielded a stable foam. In this example, the foam was stable for about 5-10 minutes.

In another step, the foaming agent was cooled to about ambient temperature. 5 kg of glycerol was added to the foaming agent to create a shelf stable foaming agent. In this example, the pH of this shelf stable foaming agent was 3.9 and the water activity was 0.77. Upon combination with glycerol, the foaming agent was shelf-stable for at least one year and does not biodegrade.

Although the disclosure has been described with references to various embodiments, persons skilled in the art will recognized that changes may be made in form and detail without departing from the spirit and scope of this disclosure.

What is claimed is:

1. A method of making a foaming agent comprising:

preparing a liquid maltodextrin solution by dissolving maltodextrin in a solvent;

combining the liquid maltodextrin solution with an octenyl succinic anhydride (OSA) solution to form a biphasic maltodextrin-OSA mixture;

agitating the biphasic maltodextrin-OSA mixture until homogenous creating a homogenous solution;

adjusting the pH of the homogenous solution to a predetermined threshold to prevent growth of microbes and to yield the foaming agent; and adding glycerol to the foaming agent to form a shelf stable foaming agent.

2. The method of claim 1, wherein the maltodextrin and OSA are present at a ratio of about 1:10 wt./wt.

3. The method of claim 1, wherein the glycerol is added in an amount about equal to the amount of maltodextrin, by weight.

4. The method of claim 1, wherein the solvent is water and wherein the maltodextrin and water are present at about equal parts, by weight.

5. The method of claim 1, further comprising heating the biphasic maltodextrin-OSA mixture during agitation.

6. The method of claim 5, wherein the biphasic maltodextrin-OSA mixture is heated to about 60° C. during agitation.

7. The method of claim 6, further comprising monitoring the pH of the biphasic maltodextrin-OSA mixture.

8. The method of claim 7, wherein the agitation step is performed until the pH decreases to about 2.5.

9. The method of claim 1, wherein the OSA solution and the maltodextrin are present at a ratio of about 1:10 wt/wt.

10. The method of claim 1, wherein the OSA is a cis and trans mixture.

11. The method of claim 1, the pH of the homogenous solution is adjusted through the addition of sodium hydroxide.

12. The method of claim 11, wherein the sodium hydroxide is a 50% solution of sodium hydroxide.

13. The method of claim 1, the predetermined threshold pH is about 3.6.

14. The method of claim 2, wherein the shelf stable foaming agent has a water activity of about 0.77.

15. The method of claim 2, wherein the shelf stable foaming agent is shelf stable for least about a year.

16. The method of claim 2, wherein the shelf stable foaming agent does not biodegrade.

17. The method of claim 1, wherein the biphasic maltodextrin-OSA mixture is a surfactant.

* * * * *